(12) United States Patent
Chiarelli et al.

(10) Patent No.: US 7,179,679 B2
(45) Date of Patent: Feb. 20, 2007

(54) FABRICATION OF MULTILAYERED THIN FILMS VIA SPIN-ASSEMBLY

(75) Inventors: Peter A. Chiarelli, Scottsdale, AZ (US); Jeanne M. Robinson, Los Alamos, NM (US); Joanna L. Casson, Los Alamos, NM (US); Malkiat S. Johal, Bradenton, FL (US); Hsing-Lin Wang, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 75 days.

(21) Appl. No.: 10/618,517

(22) Filed: Jul. 11, 2003

(65) Prior Publication Data

US 2004/0086649 A1   May 6, 2004

Related U.S. Application Data

(60) Provisional application No. 60/395,678, filed on Jul. 12, 2002.

(51) Int. Cl.
*H01L 51/56* (2006.01)

(52) U.S. Cl. .................. 438/99; 427/97.5; 427/384; 385/145

(58) Field of Classification Search ................ 427/384, 427/240, 163.2, 372.2, 97.1, 97.4, 94.5; 385/145; 438/99
See application file for complete search history.

(56) References Cited

U.S. PATENT DOCUMENTS

| 5,208,111 | A | | 5/1993 | Decher et al. |
| 5,518,767 | A | * | 5/1996 | Rubner et al. ............... 427/259 |
| 5,536,573 | A | * | 7/1996 | Rubner et al. ............... 428/378 |
| H2046 | H | * | 9/2002 | Roberts et al. .............. 427/162 |
| 6,451,871 | B1 | | 9/2002 | Winterton et al. |
| 6,689,478 | B2 | * | 2/2004 | Laguitton ................... 428/441 |
| 2002/0006493 | A1 | * | 1/2002 | Chabrecek et al. ........ 428/64.1 |

(Continued)

OTHER PUBLICATIONS

Dubas et al., "Factors Controlling the Growth of Polyelectrolyte Multilayers," Macromolecules, vol. 32, pp. 8153-8160, 1999.

(Continued)

*Primary Examiner*—M. Wilczewski
(74) *Attorney, Agent, or Firm*—Bruce H. Cottrell

(57) ABSTRACT

An process of forming multilayer thin film heterostructures is disclosed and includes applying a solution including a first water-soluble polymer from the group of polyanionic species, polycationic species and uncharged polymer species onto a substrate to form a first coating layer on the substrate, drying the first coating layer on the substrate, applying a solution including a second water-soluble polymer from the group of polyanionic species, polycationic species and uncharged polymer species onto the substrate having the first coating layer to form a second coating layer on the first coating layer wherein the second water-soluble polymer is of a different material than the first water-soluble polymer, and drying the second coating layer on the first coating layer so as to form a bilayer structure on the substrate. Optionally, one or more additional applying and drying sequences can be repeated with a water-soluble polymer from the group of polyanionic species, polycationic species and uncharged polymer species, so that a predetermined plurality of layers are built up upon the substrate.

13 Claims, 5 Drawing Sheets

U.S. PATENT DOCUMENTS

| | | | |
|---|---|---|---|
| 2003/0026898 A1* | 2/2003 | Hong et al. | 427/240 |
| 2003/0146436 A1* | 8/2003 | Parker et al. | 257/72 |
| 2004/0018295 A1* | 1/2004 | Qiu et al. | 427/2.1 |
| 2004/0086649 A1* | 5/2004 | Chiarelli et al. | 427/384 |
| 2004/0102577 A1* | 5/2004 | Hsu et al. | 525/182 |

OTHER PUBLICATIONS

Johal et al., "Polyelectrolyte Trilayer Combinations Using Spin-Assembly and Ionic Self-Assembly," Langmuir, vol. 19, pp. 8876-8881, 2003.

Chiarelli et al., "Polyelectrylyte Spin-Assembly," Langmuir, vol. 18, pp. 168-173, 2002.

Cho et al., "Fabrication of Highly Ordered Multilayer Films Using a Spin Self-Assembly Method," Adv. Mater, vol. 13, No. 14, pp. 1076-1078, 2001.

Decher, "Fuzzy Nanoassemblies: Toward Layered Polymeric Multicomposites," Science, vol. 277, pp. 1232-1237, 1997.

* cited by examiner

US 7,179,679 B2

FABRICATION OF MULTILAYERED THIN FILMS VIA SPIN-ASSEMBLY

This application claims the benefit of the filing date of U.S. provisional application No. 60/395,678 filed Jul. 12, 2002.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates to a process for fabricating multilayered thin films of water-soluble polymers using spin-assembly.

BACKGROUND OF THE INVENTION

In recent years, the construction of multilayer organic films from polyelectrolytes of alternating charge has received much attention due to the high degree of molecular order induced by interlayer electrostatic forces in these systems. Until now, repeated bilayers have been produced using a variety of methods, including Langmuir-Blodgett deposition, vapor deposition, ionic self-assembly, and drop-casting. For example, ultrathin organic films of alternating charged layers have been constructed by ionic self-assembly, vapor deposition, and Langmuir-Blodgett deposition for use in applications such as biological sensing, optical switching, and waveguiding. Using electrostatic forces to spontaneously induce desired molecular architectures in layer-by-layer organic films has opened up new applications in nonlinear optics for such devices. For example, the ability to modulate a second harmonic signal through the deposition of alternating layers has recently been shown by Casson et al., J. Phys. Chem. B, vol. 104, pp. 11996–12001 (2000). In multilayered films, the effects of the substrate, surface modification, solution pH, deposition temperature, and salt concentration, have been explored extensively.

Deposition of organic material by spin-coating has been done for almost a century. Spin coating, a technique used for casting chemical layers onto a rotating substrate, has been used extensively to prepare thin films for diverse industrial applications such as photolithography, light emission, nuclear track detection, and gas sensing. While the practice of spin coating has existed since the 1920s, mathematical modeling of the spin-coating process began in the late 1950s, when Emslie et al., J. Appl. Phys., vol. 29, pp. 858–862 (1958) described the radial flow of liquids deposited on rotating substrates. Since then, monolayer film formation dynamics has been studied both experimentally and theoretically. Effects of solvent evaporation, liquid viscosity, spin speed, spin time, solute concentration, and solute molecular weight have been examined for a variety of spin-coated systems. The simplicity, time-efficiency, and cost-effectiveness of spin coating make it a practical method for the deposition of polymer thin films. The two main parameters that control the amount of polyelectrolyte adsorbed onto the substrate are solute concentration and spin rate. These have been shown to directly influence the thickness of monolayer films. Dubas et al., Macromolecules, vol. 32, pp. 8153–8160 (1999) have fabricated smoother multilayer polyelectrolyte films by immersing spinning substrates into polyelectrolyte solutions. However, in the present invention, multilayer water-soluble polymer films are spin-assembled by applying, e.g., dropping, a solution onto a spinning substrate.

The present invention involves the ability to control the deposition of water-soluble polymers spin-assembled into multilayer films with monolayer thicknesses on the order of angstroms. The technique of the present invention deposits multilayers onto a substrate in controlled amounts.

A need remains for a procedure of forming multilayer films. After extensive and careful investigation, applicants have now developed an improved process for forming a multilayer thin film heterostructure which shows high control of linear deposition (i.e., thickness, amount and reproducibility).

SUMMARY OF THE INVENTION

To achieve the foregoing and other objects, and in accordance with the purposes of the present invention, as embodied and broadly described herein, the present invention provides a method of forming a multilayer thin film heterostructure including applying a solution including a first water-soluble polymer selected from the group consisting of polyanionic species, polycationic species and uncharged polymer species onto a substrate to form a first coating layer on the substrate, drying the first coating layer on the substrate, applying a solution including a second water-soluble polymer selected from the group consisting of polyanionic species, polycationic species and uncharged polymer species onto the substrate having the first coating layer thereon to form a second coating layer on the first coating layer where the second water-soluble polymer is characterized as a different material than the first water-soluble polymer, and drying the second coating layer on the first coating layer, so that a bilayer is built up upon said substrate. In another embodiment, the process further includes repeating one or more additional applying and drying sequence with a water-soluble polymer selected from the group consisting of polyanionic species, polycationic species and uncharged polymer species, so that a predetermined plurality of layers are built up upon the substrate. In another embodiment of the invention, the solution applied to the substrate further includes a surfactant. In another embodiment of the invention, the solution applied to the substrate further includes a dye molecule.

DETAILED DESCRIPTION

The present invention is concerned with a process for fabricating multilayered thin films of water-soluble polymers using spin-assembly. A 50 bilayer PEI/PAZO film has been constructed that shows linear growth in the amount of adsorbed material.

The water-soluble polymer materials used can include polyanionic materials, polycationic materials and uncharged polymer species. The polyanionic materials can be from materials such as PAZO (poly[1-[4-(3-carboxy-4-hydroxy-phenylazo)benzene sulfonamido]-1,2-ethanediyl, sodium salt]), PSS (poly(styrenesulfonate)), PAA (poly(acrylic acid)), and an alternating copolymer APC (poly(4-[4-({4-[3-amino-2-(4-hydroxy-phenyl)propylcarbamoyl]-5-oxo-pentyl}-methyl-amino)-phenylazo]-benzenesulfonic acid)) having azobenzene and phenol groups as side chains. The polycationic materials can be from materials such as PEI (poly(ethylenimine), PDDA (poly(diallyldimethyl ammonium chloride), PAH (poly(allylamine hydrochloride), and different generations of poly(propylenimine) dendrimers. The uncharged polymeric materials can be from materials such as poly(vinylpyrrolidinone) and the like.

PAZO was chosen as an exemplary polyanion because it possesses a chromophore that allows its adsorption behavior to be monitored by UV-visible spectroscopy. Additionally, since the PAZO chromophore is a conjugated system possessing electron donor and acceptor groups, the nonlinear optical properties of films including these type materials may be useful in certain applications. The polycations do not contain a chromophore and therefore show no features in the UV-visible spectrum. PEI/PAZO bilayers have been well studied in ionically self-assembled films formed by adsorption from solution.

The spin assembly process of the present invention has allowed preparation of thin multilayered films including multiple bilayers of a polycationic material and a polyanionic material, e.g., PEI/PAZO, generation 3.0 dendrimer/PAZO, generation 4.0 dendrimer/PAZO, PAH/PSS, and PDDA/PAA. Additionally, the process of the present invention has allowed preparation of thin multilayered films including multiple trilayers of a polycationic material, a first polyanionic material and a second polyanionic material, e.g., PEI/PAZO/PSS and PEI/APC/PSS or multiple trilayers of a polycationic material, a polyanionic material and an uncharged polymer material, e.g., PEI/PAZO/PVP.

In addition, the films deposited in the process of the present invention can further include a surfactant, e.g., an anionic surfactant such as sodium dodecyl sulfate or the like, a cationic surfactant or a neutral surfactant. Such surfactants can be added as a component in a solution to be coated upon a substrate. Also, the films deposited in the process of the present invention can further include a water-soluble dye molecule such as an anionic dye molecule, e.g., a tetrakisazo dye available as Direct Red 80 (Color Index Number 35780) available from Aldrich Chemical Company.

Figure 1:
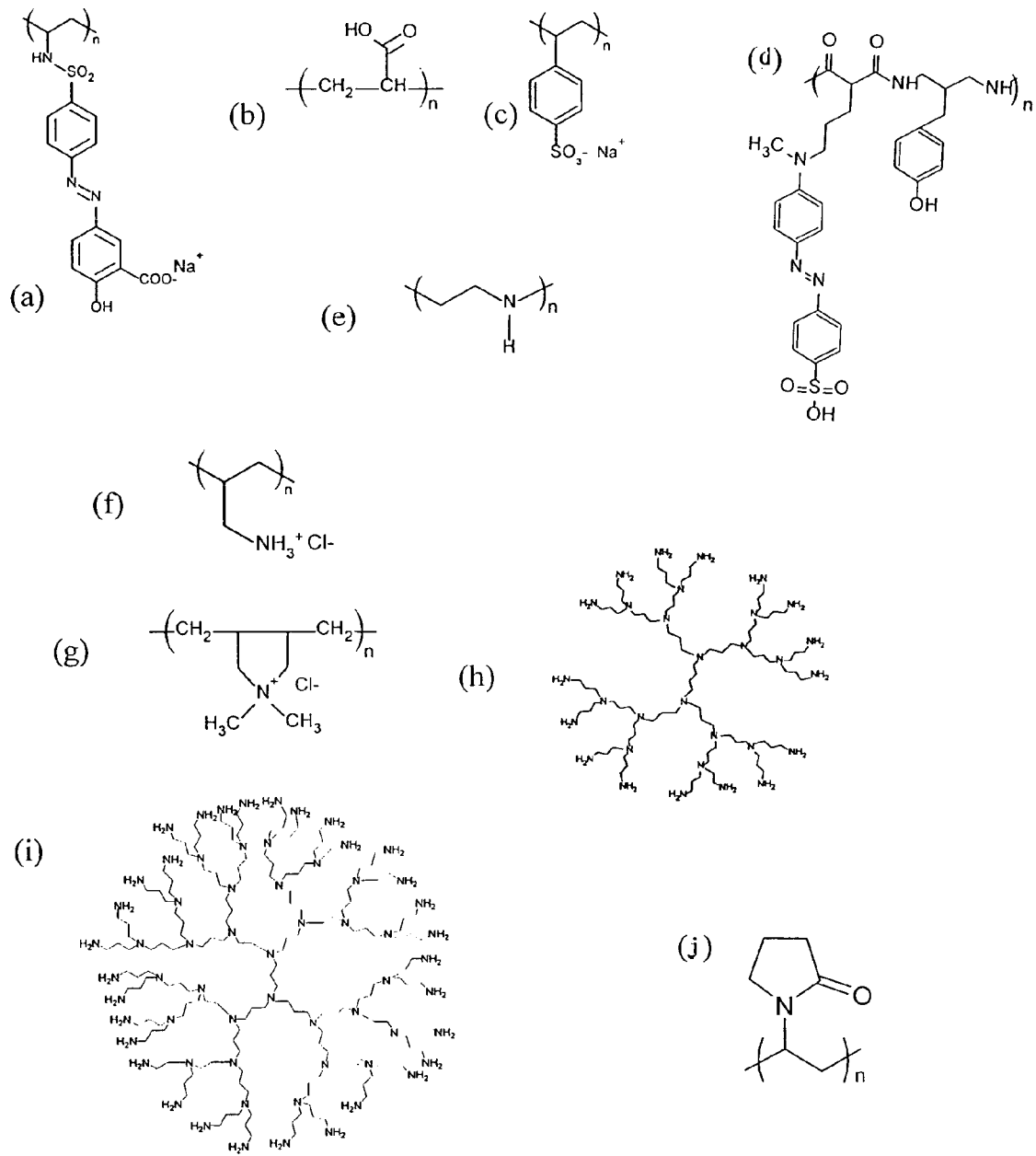
FIG. 1 shows molecular structures of polyanions: (a) PAZO; (b) PAA; (c) PSS; and, (d) APC; of polycations (e) PEI; (f) PAH; (g) PDDA; (h) generation 3.0 poly(propylenimine) dendrimer; (i) generation 4.0 poly(propylenimine) dendrimer; and, of neutral polymer (j) PVP.
Figure 2:
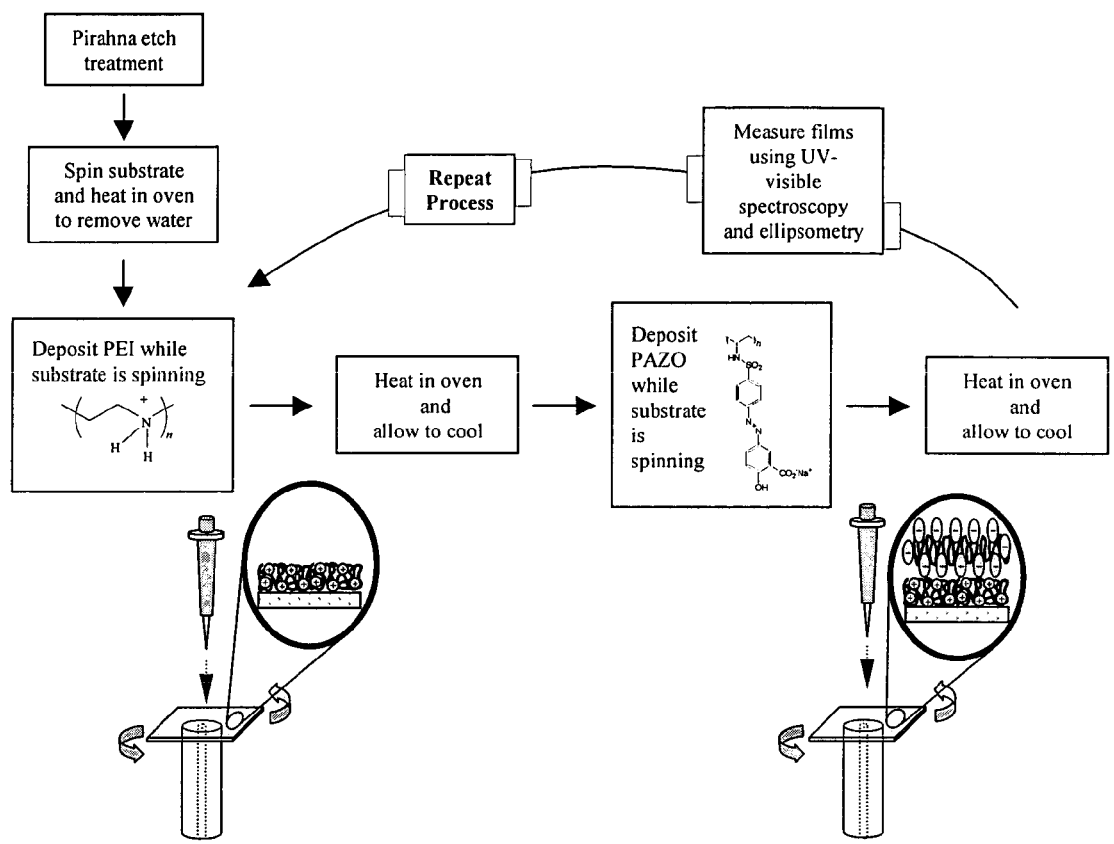
FIG. 2 shows a schematic drawing of an exemplary spin assembly process of the present invention.

A diagram of an exemplary spin-assembly procedure is shown in FIG. 2. Substrates for film deposition were glass microscope slides, round 1-inch polished silicon wafers, and round 1 inch quartz crystal plates. Substrates were treated with a 30:70 $H_2O_2/H_2SO_4$ mixture (commonly referred to as a piranha solution) at 80° C. for 1 hour, followed by rinsing and sonication in ultrapure water for 15 minutes to remove any remaining etch solution. Prior to film deposition, bare substrates were spun at 3000 RPM, and then heated (110° C.) or subjected to a vacuum (381 mm Hg at 40° C.) for 1 min to remove any surface water. In one embodiment, the spin-assembly process for a single bilayer consisted of dropping 1 mL of a polycationic material, e.g., PEI solution, on the negatively-charge substrate, oven drying at 110° C. for 1 minute, allowing the substrate to cool for one minute, dropping 1 mL of a polyanionic material, e.g., PAZO solution, on the polycationic material-coated substrate and finally heating and cooling as before. The process was then repeated for a predetermined number of bilayers. Other experimental variables, such as applying gaseous nitrogen to dry the films, rinsing with water between water-soluble polymer depositions, air drying the films, and performing the process with no heating, air-drying, or spin-rinsing, were tried to determine how to optimize the regularity of adsorption. Oven drying was found to be an important step for obtaining regular amounts of solute adsorption. When the films were not oven-dried, linear UV-absorption of the multilayer films was not observed. While not wishing to be bound by the present explanation, it is believed that oven drying removes surface water molecules and results in a more reproducible surface for adsorption of the oppositely charged water-soluble polymer. It has also been found that placing the substrate in a vacuum (381 mm Hg. At 40° C.) after each deposition cycle yields a similar uniformity in the amount of adsorbed material.

The experimental procedure described above was used to make films up to 50 bilayers. All films constructed showed uniform adsorption of PAZO in each bilayer. It is expected that films much greater than fifty bilayers could be made with regular bilayer thickness throughout. The amount of PAZO in the spin-assembled films was monitored by UV-visible spectroscopy through the detection of the azobenzene $\pi \rightarrow \pi^*$ transition peak around 365 nm. A linear relationship was obtained for the peak absorbance versus the number of bilayers. This shows that equivalent amounts of PAZO were adsorbed in each bilayer. There is a very short contact time (less than 0.25 seconds) between the substrate or coated substrate and the polymer solution. The process of the invention allows faster deposition of similar quantities of polymer material than can be deposited by dipping processes such as ionic self assembly.

Figure 3:
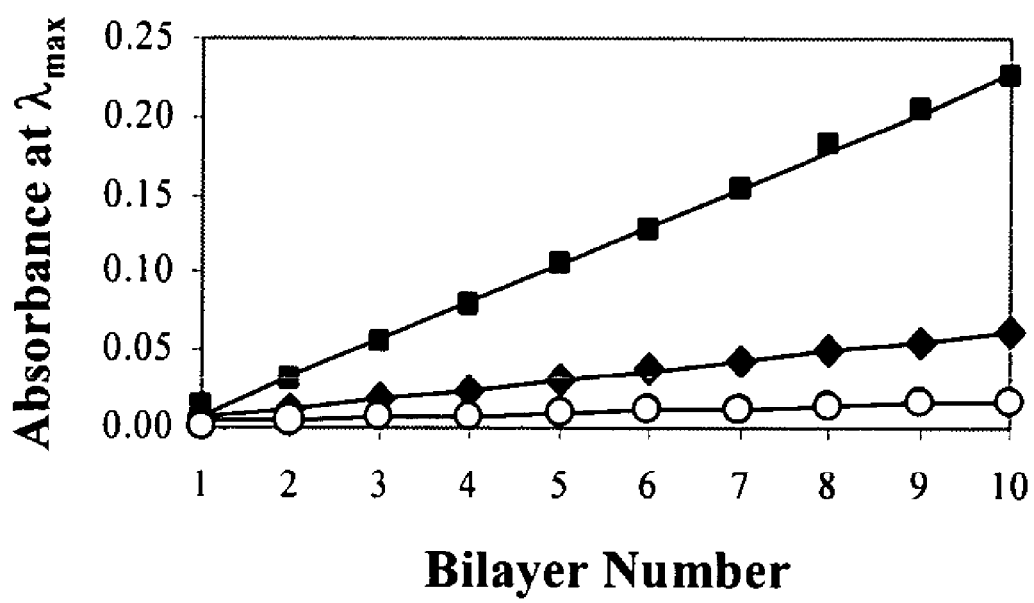
FIG. 3 shows a graph plotting absorbance at $\lambda_{max}$ versus bilayer number for PEI and PAZO for 0 mM PEI (○), 10 mM PEI (◆) and 10 mM PEI (■), and 1 mM PAZO, assembled at 3000 rpm.

The thickness of a film of a single water-soluble polymer can be easily controlled by spin-assembly. FIG. 3 shows how the absorbance maxima change as the PEI concentration is varied from 0 to 10 mM, and how linear increases in absorbance can occur with or without a polycationic spacer layer. However, the relatively high absorbance of the PEI/PAZO spectra compared to that of the pure PAZO spectra reveal the influence of electrostatic attraction on the system. The absorbance at $\lambda_{max}$ of a 10 bilayer film built with 10 mM PEI is more than 10 times greater than that of a similar film built with no PEI. Although the same amount of PAZO is dropped in both cases, in the pure PAZO system there was no oppositely charged polycation to which it can adsorb. Linear increases in the absorbance were observed without introducing the oppositely charged water-soluble polymer. The results illustrate the difference between the purely physical deposition of the pure PAZO film and the electrostatic attraction in the PEI/PAZO films. Higher concentrations of PEI may lead to a greater amount of adsorbed PEI, and therefore lead to greater amounts of PAZO deposited on the film. The effect of PAZO concentration from 1 mM to 10 mM at 1000 rpm on film formation was also studied. In these studies, the PEI concentration was held fixed at 10 mM. By changing the concentration of PAZO in solution, the amount of PAZO in the deposited bilayers can be varied. At 1000 rpm, changing the PAZO concentration by an order of magnitude increases the adsorbed amount of PAZO three-fold. The films assembled with greater PAZO concentrations deposit greater amounts of PAZO per bilayer. Similar results are expected for a film comprised of any two oppositely charged water-soluble polymers, since the electrostatics of the molecular system dominate this process. Results with a PAH (poly(allylamine hydrochloride)/PSS (poly(styrene-sulfonate)) multilayered thin film showed a linear increase in the thickness of the film from 1 to 10 bilayers. The process of the present invention is widely applicable and may be generally used with any water-soluble polymeric system.

Figure 4:
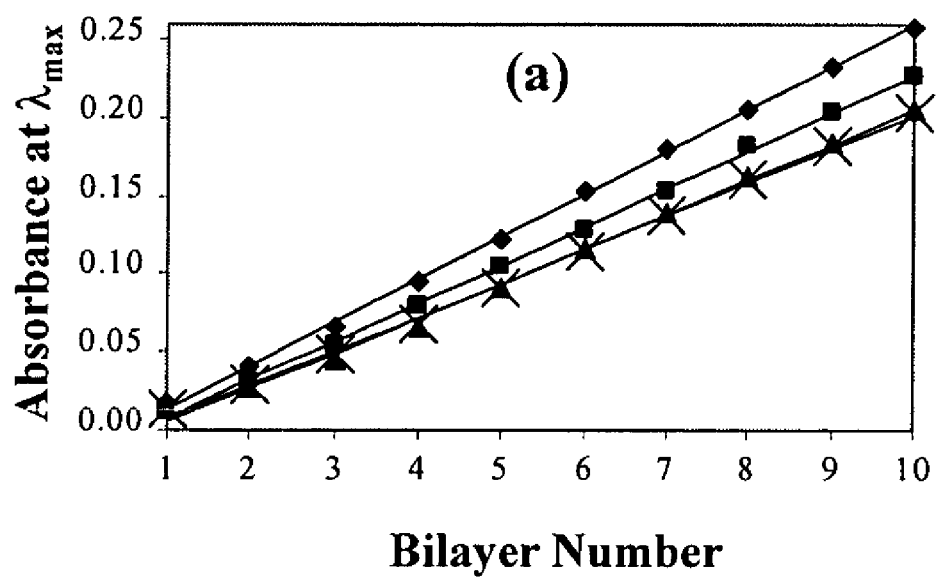
FIG. 4(*a*) shows a graph plotting absorbance at $\lambda_{max}$ for 10 mM PEI and 1 mM PAZO water-soluble thin films versus the number of bilayers at 1000 rpm (◆), 3000 rpm (■), 5000 rpm (▲) and 7000 rpm (x) and illustrates the effect of varying spin rate on the amount of PAZO adsorbed in 10 bilayer films; while 4(*b*) illustrates the same data shown as a function of spin rate for 1 to 10 bilayers.
Figure 4:
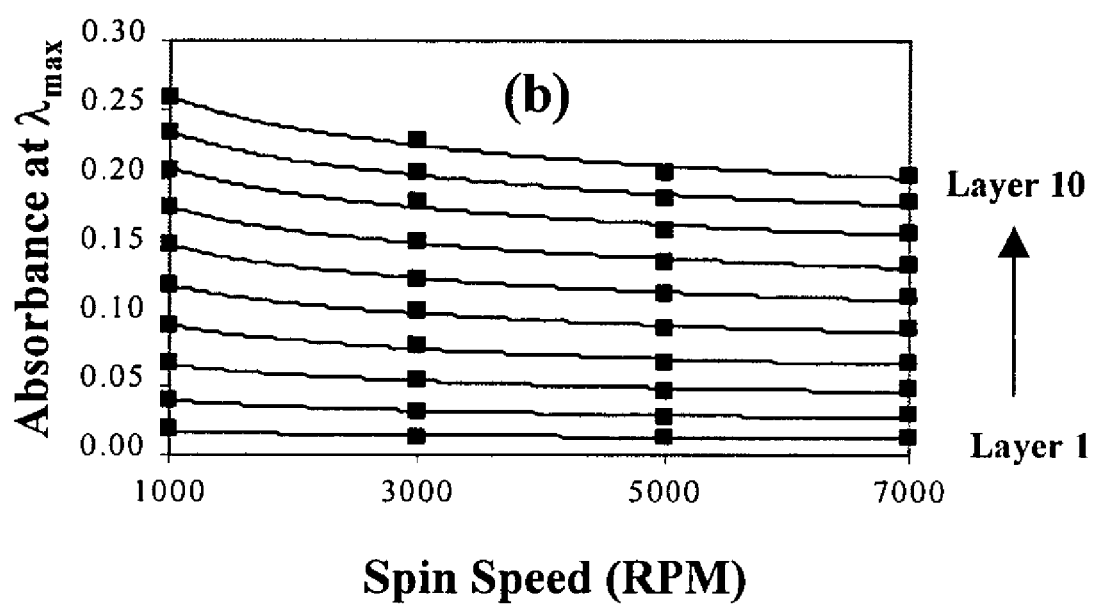

At faster spin rates, there is a shorter contact time between the water-soluble polymers and the substrate or coated substrate. FIG. 4(a) shows the effect of varying spin rate on the amount of PAZO adsorbed in 10 bilayer films. By increasing the spin rate, smaller amounts of PAZO are adsorbed on the surface. A linear increase in the amount of PAZO deposited over a 10 bilayer film was observed for all four spin rates. There is very little difference in the amounts of PAZO adsorbed in films formed at either 5000 rpm or 7000 rpm. The behavior of PAZO adsorption in each bilayer over a range of spin rates is shown in FIG. 4b. At low rpm, small changes in spin rate resulted in large changes in the amount of PAZO adsorbed. However, at high rpm, the absorbance reached an asymptotic value. Increasing the spin rate at high rpm yielded little changes in PAZO adsorption.

Figure 5:
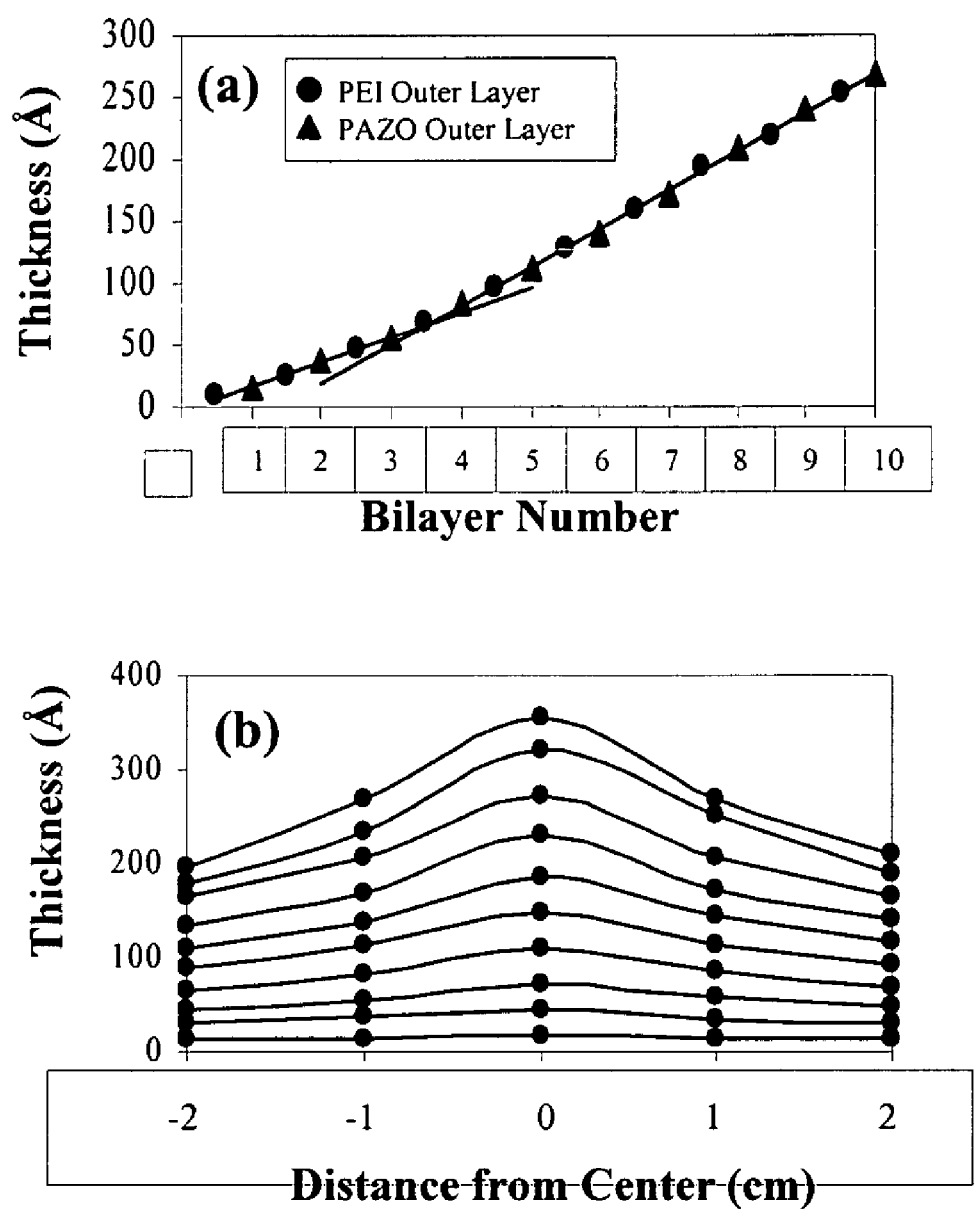
FIG. 5(a) shows a graph plotting ellipsometric thickness versus bilayer number for PEI and PAZO illustrating an overall linear increase in the thickness of the film as the number of bilayers increases, and 5(b) illustrates thickness as measured from the center of the substrate sample.

Ellipsometric measurements taken on a null ellipsometer (Rudolph Research Auto EL) confirmed that the increasing UV-visible absorbance observed for each bilayer corresponds to an increasing film thickness. The overall error in the film thicknesses is approximately ±2 Å. The thickness was measured across the width (approximately 4 cm) of the 10 bilayer films on silicon substrates for each PEI and PAZO monolayer. FIG. 5(a) shows that while there appears to be an overall linear increase in the thickness of the film as the number of bilayers increases, there are actually two slopes. For bilayers 1–3, the slope was approximately 20 Å/bilayer, while for bilayers 4–10, the slope increased to 31 Å. This is indicative of the effect that the negatively-charged substrate has on the assembling of the films. While the linear UV-absorption measurements indicated that the same amount of PAZO was being adsorbed in each bilayer, the first three bilayers were thinner than the subsequent bilayers. This also suggested that the packing density of the first three bilayers was greater than that of subsequent bilayers. After three bilayers, there may have been enough of the positively-charged PEI adsorbed onto the film to effectively screen the substrate and decrease the packing density of the adsorbed PAZO in subsequent layers. Furthermore, the adsorbed material at four bilayers and beyond is at a sufficient distance from the substrate to diminish the substrate's effect on the adsorption process. An absorbance maximum value of 0.0133 for the first bilayer of a 1 MM PAZO/10 mM PEI system spun at 3000 rpm corresponds to a thickness of 15 Å (at 1 cm from the center of the film). The thickness of each bilayer is greatest at the center of the film (FIG. 5b). At 10 bilayers, the maximum thickness was 356 Å. This agrees qualitatively with the ellipsometry data for monolayer films presented by Birnie et al., Opt. Eng., vol. 31, pp. 2012–2020 (1992).

The layer thicknesses for PEI/PAZO films built using both oven drying and vacuum suction, the films having 10 bilayers, was approximately equivalent (~100 Å) for both films. However, the films show different behavior upon treatment with either heat or vacuum. After heat treatment, a series of small decreases (~1 Å) is observed in ellipsometric thickness. This result suggests that heating may have caused partial annealing of the film. In the case of vacuum treatment, decreases in film thickness were not observed. Instead, slight increases in film thickness were seen.

The present invention is more particularly described in the following examples which are intended as illustrative only, since numerous modifications and variations will be apparent to those skilled in the art.

Thin films were spin-assembled from aqueous polymer solutions on a Headway Research photoresist spinner at 3000 rpm.

UV-visible measurements of the multilayered films built on glass and quartz substrates were taken between 300–700 nm on a Perkin-Elmer Lambda 19 spectrophotometer and between 190–700 nm on a Varian Cary 300 spectrophotometer. Spectra were obtained for every layer.

Ellipsometric measurements were collected on a Rudolph Research AutoEL III single-wavelength null-ellipsometer. One-inch round single-side-polished silicon wafers were used as substrates for film characterized by ellipsometry. Similar silicon oxide surface layers for all substrate types provided reproducible surface conditions for film deposition. Data was collected at a beam incidence angle of 70° and a wavelength of 632.8 nm. A refractive index of 1.5+0 i was used to manually calculate ellipsometric film thicknesses from $\Delta$ and $\Psi$ parameters. The substrate measurements were subtracted from the film measurements to determine total ellipsometric film thickness.

The spin-assembled materials were purchased from Aldrich with the exception of APC. The solutions were prepared by dilution in deionized (DI) water (resistance>18.0 M$\Omega$) at concentrations of 1 mM and 10 mM (calculated using monomeric weights).

EXAMPLE 1

PDDA/PAA. A total of 18 spin-assembled bilayers of polycationic PDDA and polyanionic PAA were spin-assembled following the sequence set out in FIG. 2 and characterized by ellipsometry. Similar to the ~350 Å PEI/PAZO films described above, layers within the first 50–80 Å of the PDDA/PAA film show a slightly different rate of thickness growth than the remainder of the film. In the PDDA/PAA film, this 50–80 Å region corresponds approximately to the $5^{th}$ bilayer. This difference is believed due to packing density, not deposition amount, since UV-visible measurements on the PEI/PAZO system show no noticeable deviations from linear growth in the region where the change in thickness growth occurs. After the $5^{th}$ bilayer of the PDDA/PAA film, linear increases in thickness were observed.

EXAMPLE 2

PAH/PSS. PAH and PSS were spin-assembled and characterized using UV-visible spectroscopy and ellipsometry. For all PAH/PSS films, quartz crystal substrates were used to monitor the PSS absorption peak around 225 nm. UV-visible spectra show that the amount of PSS deposited increases linearly for every bilayer. The ellipsometric data also show linear increases up to 10 bilayers. Since the 10-bilayer film is only 90 Å thick, the expected substrate effect around 50–80 Å may not be obvious.

EXAMPLE 3

Dendrimer/PAZO. PAZO was also assembled with two polycationic macromolecules of different size: a generation 3.0 poly(propylenimine) dendrimer and a generation 4.0 poly(propylenimine) dendrimer. Consistent film deposition for the generation 3.0 dendrimer and PAZO in both ellipsometric and UV-visible measurements for spin-assembled systems was found. In addition, the linearity of films assembled using the generation 4.0 dendrimer and PAZO was found. Achieving this linear growth in deposition amount required a slight change in our standard procedure. Instead of heating the substrate for one minute at 110° C., it was heated for three minutes. Without the additional heating time, linear increases in the maximum UV-visible absorbance were not observed. Increased heating time was needed for the dendrimer/PAZO systems, possibly due to the multiple hydrogen bonding sites of dendrimer, which increased its tendency to retain water.

Although similar amounts of PAZO are absorbed for films built from the two generations of dendrimers, the ellipsometric thicknesses are much larger for the generation 4.0 dendrimer than for generation 3.0 dendrimer. The difference probably arises from a high degree of interpenetration between the generation 3.0 dendrimer layer and the PAZO layer, thus collapsing the PAZO layer due to conformational reorientation.

Films built using two generations of dendrimer and PAZO suggest that interpenetration between layers may dramatically impact the thickness of films, but will not significantly change the total amount of water-soluble polymer deposited.

EXAMPLE 4

PEI/APC/PSS. A PEI/APC/PSS trilayer system was constructed by spin-assembly using concentrations of 0.1 mM APC and 1 mM of both PEI and PSS. The ellipsometric film thickness for the PEI/APC/PSS system increased with deposition of each layer. The total film thickness after 10 trilayers was 148±2 Å. The thickness increase per layer was similar for all three species up to about 35 Å, at which point the thickness increased more rapidly for the APC. After 35 Å, the average increases in thickness per layer were 2.1 Å for PEI, 10.6 Å for APC and 2.1 Å for PSS. The increase in thickness observed with the addition of each water-soluble polymer was consistent with the formation of the trilayers.

EXAMPLE 5

PEI/PAZO/PVP. A PEI/PAZO/PVP trilayer system was constructed by spin-assembly using concentrations of 1 mM for each material. The total thickness after 10 trilayers was 201 Å.

EXAMPLE 6

PEI/PAZO/PSS. A PEI/PAZO/PSS trilayer system was constructed by spin-assembly using concentrations of 10 mM for each material. The visible absorption around 364 nm showed linear growth as a function of trilayer number for the films. The increase in absorbance was due only to the PAZO layer. Deposition of either PEI or PSS caused a slight PAZO desorption. The ellipsometric film thickness for the system increased with deposition of each water-soluble polymer layer. The total thickness after 10 trilayers was 1681±5 Å. The thickness increase per layer was similar for all three components and was smaller below 300 Å. The average increase in thickness per layer was 54 Å for PEI, 58 Å for PAZO and 57 Å for PSS. The ellipsometric data showed that trilayer repeat units containing two like-charged layers can be constructed by spin-assembly. Similar results were obtained using concentrations of 1 mM instead of 10 mM for each water-soluble polymer.

EXAMPLE 7

The integrity of spin-assembled PEI/PAZO/PVP films (example 5) and PEI/PAZO/PSS films (example 6) was tested by immersing them in pure water for long periods of time (>17 hours) and measuring the UV-visible absorbance at various time intervals. For both of the films, the PAZO absorption maximum remained constant within 2 percent over the measured time, implying that little or no PAZO desorbed from the surface. Since the release of polyanionic or uncharged material into solution from outer or inner trilayers would likely result in the concurrent desorption of some PAZO, it was inferred that all the material stayed attached to the film surface.

Although the present invention has been described with reference to specific details, it is not intended that such details should be regarded as limitations upon the scope of the invention, except as and to the extent that they are included in the accompanying claims.

What is claimed is:

1. A method of forming a multilayer thin film heterostructure comprising:
    applying a solution including a first water-soluble polymer selected from the group consisting of polyanionic species, polycationic species and uncharged polymer species onto a spinning substrate to form a first coating layer on said substrate;
    drying said first coating layer on said substrate;
    applying a solution including a second water-soluble polymer selected from the group consisting of polyanionic species, polycationic species and uncharged polymer species onto said substrate having said first coating layer thereon to form a second coating layer on said first coating layer, said second water-soluble polymer characterized as a different material than said first water-soluble polymer;
    drying said second coating layer on said first coating layer, so that a bilayer is built up upon said substrate; and
    repeating one or more additional applying and drying sequence with a water-soluble polymer selected from the group consisting of polyanionic species, polycationic species and uncharged polymer species, so that a predetermined plurality of layers are built up upon said substrate, said plurality of layers including multiple trilayers having a polycationic layer/polyanionic layer/uncharged polymer layer structure.

2. The method of claim 1 wherein said polycationic species are selected from the group consisting of polyethylenimine, poly(diallyldimethyl ammonium chloride), poly(allylamine hydrochloride), and poly(propylenimine) dendrimers.

3. The method of claim 1 wherein said polyanionic species are selected from the group consisting of poly[1-[4-(3-carboxy-4-hydroxy-phenylazo)benzene sulfonamido]-1,2-ethanediyl, sodium salt], poly(acrylic acid), poly(styrenesulfonate), poly(4-[4-({4-[3-amino-2-(4-hydroxy-phenyl)-propylcarbamoyl]-5-oxo-pentyl}-methyl-amino)-phenylazo]-benzenesulfonic acid).

4. The method of claim 1 wherein at least one solution further includes a surfactant and a resultant coating layer from said solution including said surfactant further includes said surfactant.

5. The method of claim 1 wherein at least one solution further includes a dye molecule and a resultant coating layer from said solution including said dye molecule further includes said dye molecule.

6. A method of forming a multilayer thin film heterostructure comprising:
applying a solution including a first water-soluble polymer selected from the group consisting of polyanionic species, polycationic species and uncharged polymer species onto a spinning substrate to form a first coating layer on said substrate;
drying said first coating layer on said substrate;
applying a solution including a second water-soluble polymer selected from the group consisting of polyanionic species, polycationic species and uncharged polymer species onto said substrate having said first coating layer thereon to form a second coating layer on said first coating layer, said second water-soluble polymer characterized as a different material than said first water-soluble polymer; and,
drying said second coating layer on said first coating layer, so that a bilayer is built up upon said substrate, wherein said drying steps comprise subjecting said coated substrate to a vacuum for sufficient time to effect drying of said coating layers and one of said coating layers of said bilayer is an uncharged polymer species.

7. The method of claim 6 further including repeating one or more additional applying and drying sequence with a water-soluble polymer selected from the group consisting of polyanionic species, polycationic species and uncharged polymer species until said multilayer thin film heterostructure includes multiple trilayers having a polycationic layer/polyanionic layer/polyanionic layer structure.

8. The method of claim 7 wherein trilayer thicknesses in said polycationic layer/polyanionic layer/polyanionic layer structure are about equal.

9. A method of forming a multilayer thin film heterostructure comprising:
applying a solution including a first water-soluble polymer selected from the group consisting of polyanionic species, polycationic species and uncharged polymer species onto a spinning substrate to form a first coating layer on said substrate;
drying said first coating layer on said substrate;
applying a solution including a second water-soluble polymer selected from the group consisting of polyanionic species, polycationic species and uncharged polymer species onto said substrate having said first coating layer thereon to form a second coating layer on said first coating layer, said second water-soluble polymer characterized as a different material than said first water-soluble polymer; and,
drying said second coating layer on said first coating layer, so that a bilayer is built up upon said substrate, wherein said drying steps comprise heating said coated substrate at a predetermined temperature for sufficient time to effect drying of said coating layers and one of said coating layers of said bilayer is an uncharged polymer species.

10. The method of claim 9 further including repeating one or more additional applying and drying sequence with a water-soluble polymer selected from the group consisting of polyanionic species, polycationic species and uncharged polymer species until said multilayer thin film heterostructure includes multiple trilayers having a polycationic layer/polyanionic layer/polyanionic layer structure.

11. A method of forming a multilayer thin film heterostructure comprising:
applying a solution including a first water-soluble polymer selected from the group consisting of polyanionic species, polycationic species and uncharged polymer species onto a spinning substrate to form a first coating layer on said substrate;
drying said first coating layer on said substrate;
applying a solution including a second water-soluble polymer selected from the group consisting of polyanionic species, polycationic species and uncharged polymer species onto said substrate having said first coating layer thereon to form a second coating layer on said first coating layer, said second water-soluble polymer characterized as a different material than said first water-soluble polymer; and,
drying said second coating layer on said first coating layer, so that a bilayer is built up upon said substrate, wherein one of said coating layers of said bilayer is an uncharged polymer species and said uncharged polymer species are selected from the group consisting of poly(vinylpyrrolidinone), polysaccharides, and biopolymers.

12. A method of forming a multilayer thin film heterostructure comprising:
applying a solution including a first water-soluble polymer selected from the group consisting of polyanionic species, polycationic species and uncharged polymer species onto a spinning substrate to form a first coating layer on said substrate;
drying said first coating layer on said substrate;
applying a solution including a second water-soluble polymer selected from the group consisting of polyanionic species, polycationic species and uncharged polymer species onto said substrate having said first coating layer thereon to form a second coating layer on said first coating layer, said second water-soluble polymer characterized as a different material than said first water-soluble polymer; and,
drying said second coating layer on said first coating layer, so that a bilayer is built up upon said substrate, wherein at least one water-soluble polymer includes a chromophore and said chromophore is in a layer under the topmost layer.

13. The method of claim 12 wherein said multilayer thin film heterostructure is a non-linear optical structure.

* * * * *